United States Patent Office 3,003,230
Patented Oct. 10, 1961

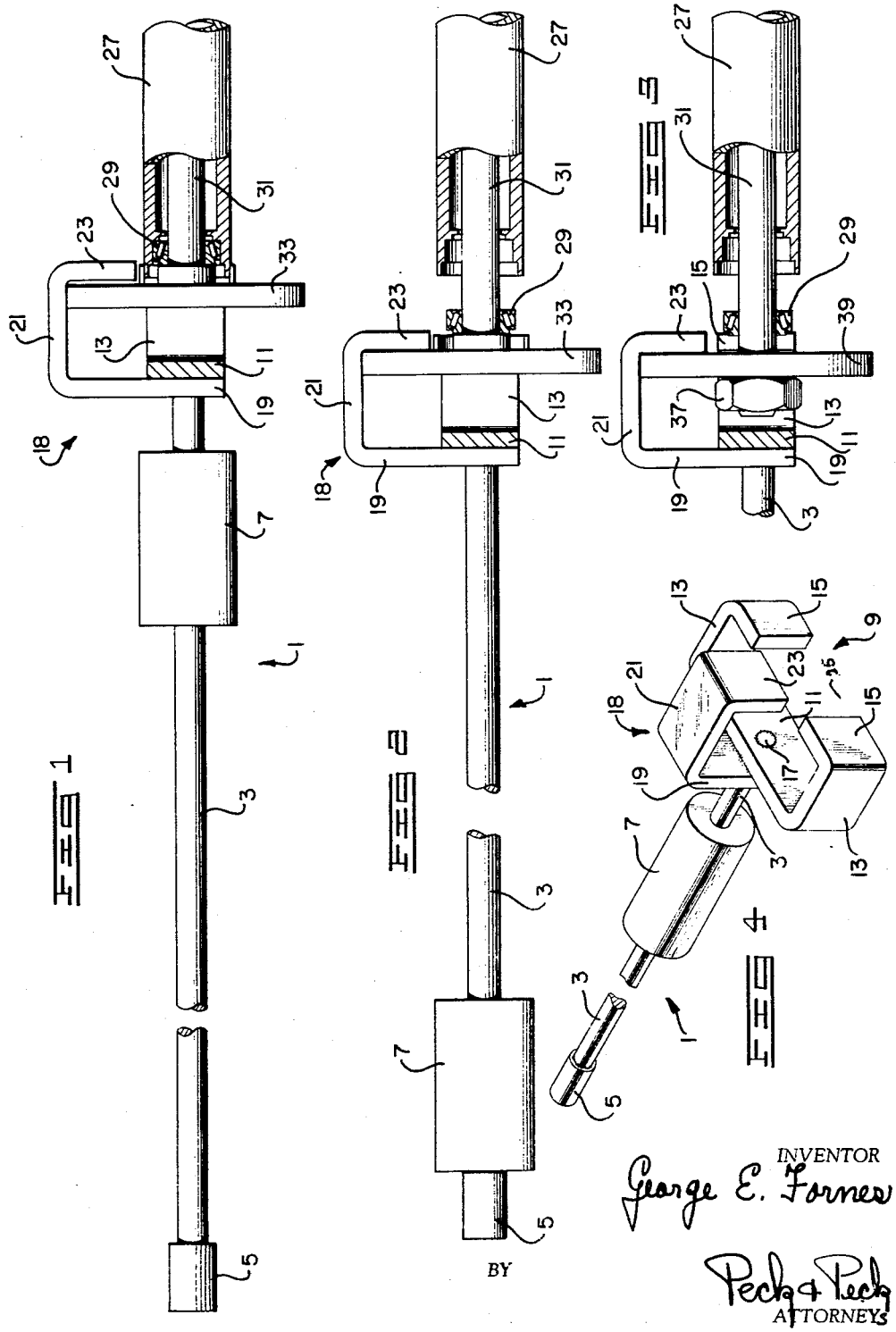

3,003,230
AXLE PULLING DEVICE
George E. Fornes, 513 S. Fayette St., Alexandria, Va.
Filed Dec. 31, 1959, Ser. No. 863,158
1 Claim. (Cl. 29—254)

This invention relates broadly to the art of devices for pulling axles and the like rod-like elements, and in its more specific aspects it relates to such devices which are impact operated and are specifically adapted for pulling rear axles and their bearings from their mounted positions within rear axle housings of vehicles; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

Experience has established that the rear axles and bearings of vehicles often bind within the rear axle housing in which they are operatively mounted, causing substantial difficulty to the mechanic who is trying to remove the axle and its bearing from the housing. Many methods and apparatus have been devised for the purpose of expediting and simplifying the task of rear axle and bearing removal; however, as far as I am aware, no one of these devices has been entirely satisfactory. The inherent defects in known devices are varied and include undue complexity of mounting and operation, resulting in mechanic's time wastage and inefficient operation, as well as substantial expense in manufacture. Many are heavy and may require more than one person in the operation of the device, which is obviously uneconomic. As a matter of fact, even with the devices now known mechanics often must use blow torches to cause metal expansion in order to remove the axle and its bearing from the housing in which they are bound or frozen.

I have devised a rear axle puller which overcomes the above-mentioned and other deficiencies which are inherent in prior art rear axle pullers.

The device of this invention is simple and easy to operate and requires only one person for its operation. It is of strong, sturdy construction; requires no maintenance; and is inexpensive to manufacture.

In developing this device I have recognized the desirability of providing for ease and speed of mounting the device in operative position on the axle to be pulled. The axle puller which I have devised comprises impact means and means which are quickly and easily associated with the axle whereby the removing impact pressures may be applied to the axle. Such means have been relatively positioned in a manner to insure the application of the removing impact pressures at points about the axle which are the most effective for causing the removal thereof. Not only have I related the means in the manner mentioned for the purpose of properly applying impact pressures to the axle, but also for the suspension of the device on the axle to relieve the operator of the full weight of the device so that he may devote his energies to the operation of the device. This is a significant operational factor for if I did not provide such ingenious mounting and suspension means, two operators would be required for the operation of the device.

It has also been one of my purposes to evolve a rear axle puller which is unusually versatile for it will function to remove axles from various and different makes of cars. The advantage of this to a shop which does work on any make of car will be apparent.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in elevation with parts thereof in section illustrating my axle pulling device is operative position mounted on an axle to be pulled.

FIG. 2 is a view similar to FIG. 1 but with the hammer in impact producing position and the axle and bearing partially removed from their housing.

FIG. 3 is a view in elevation with parts thereof in section and further parts thereof broken away, illustrating my axle pulling device in operative position mounted on an adapter fixed to an axle on a different make vehicle from that illustrated in FIGS. 1 and 2.

FIG. 4 is a perspective view of my axle pulling device.

In the accompanying drawings I have used the numeral 1 to designate my axle pulling device in its entirety. The device consists of an elongated handle or hammer guide 3 which may take the form of a metallic rod. On the rear end of handle 3 I form a metallic boss, knob or anvil 5 of cylindrical configuration and of greater diameter than the diameter of rod 3. A hammer 7 of generally cylindrical form is slidably mounted on the handle 3 for axial movement therealong. As will become apparent the hammer comprises the impact member and is a metallic solid except for the axial opening therethrough through which rod 3 extends and is of the necessary weight to function as an impact member.

At its forward or opposite end the handle 3 mounts what I shall term the impact pressure applying and mounting means which I have designated generally by the numeral 9. This pressure applying and mounting means consists of a member of generally C shape consisting of a base 11 from each end of which arms 13 extend forwardly at right angles to said base. The arms 13 terminate in inwardly directed impact pressure applying fingers or hooks 15, the inner ends of which are spaced apart as clearly illustrated in FIG. 4 of the drawings. The fingers 15 extend at right angles to arms 13. The C shaped member may be fixed in any suitable manner as at 17 to the end of handle 3 so that this member extends forwardly from the handle. The C shaped member is formed of rigid metal and, of course, it is rigidly affixed to the end of the handle. The impact pressure applying and mounting means also includes a suspension and impact pressure applying element designated generally by numeral 18 and consisting of a base 19 which may be welded or otherwise firmly affixed to the rear face of base 11 intermediate the ends thereof and the handle 3 may extend through this base 19. The base 19 extends upwardly from its fixed position and perpendicularly with respect to base 11 and to a point above the upper edge thereof where it is formed with a forwardly extending arm 21, extending at right angles thereto, which terminates in a depending pressure applying finger 23 which extends in the plane of fingers 15 above and aligned with space 25 between said fingers. Like the C shaped member, the suspension and impact pressure applying element is a rigid metallic element. It will now be seen that the arms 13 are spaced approximately 90° from arm 21, as are fingers 15 and 23.

The bases, arms and fingers of the impact pressure applying and mounting means 9 are of substantial width and strength so that the impact pressures will be applied in three areas of substantial size.

I have shown in FIGS. 1 and 2 a vehicle rear axle housing 27 which mounts a bearing 29 which is fixed to and rotatively journals a rear axle 31. Fixed on the end of the axle may be a circular disc 33 to which the wheel (not shown) is removably fixed. It is to be understood that I have illustrated a type of rear axle assembly merely as one example from among many with which my axle puller may be used and I do not intend my invention to be limited to use with the type of axle assembly shown in the drawings.

In many instances great difficulty is experienced in removing the axle because the bearing is bound in the housing and considerable force and pressure must be applied in order to pull the axle and bearing from the housing.

With the rear vehicle wheel removed and the disc 33, which is fixed to axle 31, exposed, the mechanic places the operating end 9 of the device 1 over disc 33 with the suspension and impact pressure applying element 18 in uppermost position with arm 21 spaced radially above the periphery of the disc. The operator now lowers the device until arm 21 rests on the periphery of the disc and finger 23 extends downwardly adjacent the inner face of the disc. With the device in the position just described arms 13 will extend across the disc edges at diametrically opposed points since the length of base 11 is slightly greater than the diameter of the disc and fingers 15 will extend toward each other over the rear face of the disc. With the device mounted in this manner it will be understood that the device will be suspended on the disc 33 by arm 21 so that the operator is not forced to hold the entire device.

The hammer 7 is moved axially forward on handle 3 to the position illustrated in FIG. 1 and is then slid rearwardly into sharp engagement with anvil 5. Repetition of these hammer blows against anvil 5 will produce impact pressure shocks on the disc by fingers 15 and 23 at three points to free the axle and the bearing from its housing for removal of the axle and the bearing.

In some makes of vehicles a disc such as disc 33 is not fixed on the axle end; instead the end of the axle is threaded and a nut 37 (see FIG. 3) is screwed thereon. In using my axle pulling device on this type of rear axle assembly the nut 37 and vehicle wheel are removed and I apply an adapter disc 39 to the axle 31 and then thread nut 37 on the axle to maintain the adapter disc thereon, as shown in FIG. 3. The adapter disc is formed of metal and has a central hole for receiving the axle. When the adapter disc is mounted on the axle as described, the device is mounted thereon in the same way as described in connection with FIG. 1 and the hammer is operated to provide the impact pressures to the fingers and the disc.

It will now be recognized that I have devised an axle puller which is of simple construction; is easy to mount on an axle to be pulled and may be easily operated by one person.

I claim:

A device for removing axles having discs fixed thereon from their housings, including an elongated handle having impact pressure applying and suspension means rigidly fixed to the forward end thereof and extending forwardly therefrom, and an anvil fixed on the other end thereof, a weighted impact generating member slidably mounted on said handle and operative between said means and said anvil for imparting axle removing pressures to said means, said means comprising an element fixed to said forward end of the handle and extending upwardly and radially therefrom in one direction only, a member at the top of said element extending forwardly from the upper end of said element, said last named member terminating in a finger extending downwardly in a plane substantially normal to the axis of the handle, said finger adapted to engage a face of the disc for imparting impact pressure thereto when said impact generating member is operated, and a base fixed to said forward end of the handle and providing aligned sections extending in opposite directions from the handle and perpendicularly with respect to said element, and each section terminating in a forwardly directed arm and each arm terminating in a finger, the last named two fingers being directed toward each other and each being adapted to engage a face of the disc for imparting impact pressures thereto when said impact generating member is operated, the first named finger being substantially coplanar with and normal to the second named fingers, all of said fingers being of such lengths to provide a space therebetween, whereby said last named member may rest on the upper edge of the disc to provide the sole support for said forward end of the device, and said element and said base being spaced from all said fingers for providing an unobstructed area therebetween of greater depth than the thickness of the disc which is adapted to be received therein, and said unobstructed area below said member being open at its bottom for receiving the disc therethrough.

References Cited in the file of this patent

UNITED STATES PATENTS

| | | |
|---|---|---|
| 282,997 | Leet | Aug. 14, 1883 |
| 543,652 | Palm | July 30, 1895 |
| 2,310,372 | Oserowsky | Feb. 9, 1943 |
| 2,779,089 | Allen | Jan. 29, 1957 |
| 2,791,926 | Guyton | Mar. 14, 1957 |